United States Patent [19]
Atake

[11] Patent Number: 6,017,622
[45] Date of Patent: *Jan. 25, 2000

[54] TRANSFER FILM FOR PROVIDING PICTURES ONTO A MOLDED PRODUCT SIMULTANEOUSLY WITH MOLDING AND PRODUCING METHOD THEREOF

[75] Inventor: Hiroyuki Atake, Tokyo, Japan

[73] Assignee: Dai Nippon Printing Company, Ltd., Tokyo, Japan

[ * ] Notice: This patent is subject to a terminal disclaimer.

[21] Appl. No.: 09/039,372

[22] Filed: Mar. 16, 1998

Related U.S. Application Data

[62] Division of application No. 08/603,192, Feb. 20, 1996, Pat. No. 5,759,684, which is a continuation of application No. 08/274,797, Jul. 14, 1994, abandoned.

[30] Foreign Application Priority Data

Jul. 16, 1993 [JP] Japan .................................. 5-177030

[51] Int. Cl.⁷ ...................................................... B32B 3/00
[52] U.S. Cl. ........................ 428/337; 428/195; 428/500; 428/913; 428/914
[58] Field of Search ................................... 428/195, 500, 428/515, 914, 337, 913; 427/147

[56] References Cited

U.S. PATENT DOCUMENTS

| | | |
|---|---|---|
| 4,225,641 | 9/1980 | Yokomizo . |
| 4,810,320 | 3/1989 | Inagaki . |
| 4,994,224 | 2/1991 | Itoh et al. . |
| 5,236,767 | 8/1993 | Torigoe et al. . |
| 5,403,422 | 4/1995 | Kawai et al. . |
| 5,759,684 | 6/1998 | Atake ........................................ 428/337 |

FOREIGN PATENT DOCUMENTS

| | | |
|---|---|---|
| 0 312 299 A1 | 4/1989 | European Pat. Off. . |
| 0 479 223 A1 | 4/1992 | European Pat. Off. . |
| 25 39 295 A1 | 3/1976 | Germany . |
| 4425342 A1 | 1/1995 | Germany . |
| 2-42080 | 9/1990 | Japan . |
| 4-5358 | 1/1992 | Japan . |
| 4-42172 | 7/1992 | Japan . |
| 5-301250 | 11/1993 | Japan . |

Primary Examiner—William Krynski
Assistant Examiner—Hong J. Xu
Attorney, Agent, or Firm—Oliff & Berridge, PLC

[57] ABSTRACT

In a method of producing a transfer film for providing pictures onto a molded product simultaneously with molding of the present invention, a resin which is dispersed in a dispersing medium to form a water-dispersed emulsion is coated on a substrate film made of a water-insoluble thermoplastic resin. Then the substrate film is dried until the coat solidifies to form a release layer. Further, a transfer layer which includes paint or ink diluted with an organic solvent for forming a desirable picture is formed on the release layer. Thereafter, the solvent is evaporated until the transfer layer turns to a solid film. Thus produced transfer film is used in the provision of pictures onto a molded product simultaneously with molding while insuring that the substrate film of the transfer film can be smoothly peeled from the picture or design layer after it is transferred to the shaped part without impairing the molding efficiency.

7 Claims, 6 Drawing Sheets

TRANSFER FILM FOR PROVIDING PICTURES ONTO A MOLDED PRODUCT SIMULTANEOUSLY WITH MOLDING AND PRODUCING METHOD THEREOF

This is a Division of application Ser. No. 08/603,192 filed Feb. 20, 1996, now U.S. Pat. No. 5,759,684 which in turn is a continuation of application Ser. No. 08/274,797 filed Jul. 14, 1994. The entire disclosure of the prior application(s) is hereby incorporated by reference herein in its entirety.

BACKGROUND OF THE INVENTION

1. Field of the Invention

The present invention relates to a molded-in transfer film, or a transfer film that is used in transferring pictures (or designs) to molded products simultaneously by injection molding, vacuum press forming or the like. The present invention also relates to a method for producing such molded-in transfer film.

2. Detailed Description of the Related Art

Transfer printing, commonly known as decalcomania, is a technique for providing pictures on molded products. In the transfer printing, a transfer layer carrying a picture or design is formed on a peelable substrate film and the resulting transfer film is used in such a way that the picture or design is transferred to another substrate for permanent fixing. A release layer may be provided, as required, on the peelable substrate film. In general transfer films, the transfer layer typically contains a strippable layer, a picture or design layer and an adhesive layer as essential parts. The adhesive layer is to insure that the transfer layer is positively transferred and bonded to the permanent substrate and may typically employ a heat-sensitive adhesive, a solvent-activatable adhesive or an ionizing radiation curable adhesive. The strippable layer protects the transfer layer after it is transferred to the permanent substrate. The release layer formed on the peelable substrate film facilitates the peeling of the transfer layer from the substrate film, and remains on the latter after transfer. The peeling occurs at the interface between the release layer and the strippable layer. The release layer is a film that is typically formed of a silicone resin, a melamine resin, etc. either by simple coating or other suitable techniques such as extrusion.

In recent years, proposals have been made that such transfer films be used to provide pictures on shaped parts simultaneously with their products as by injection molding or vacuum press forming. A brief description of the method for providing pictures simultaneously with injection molding is given below with reference to FIGS. 1 and 2 which should be looked at in combination with Examined Japanese Patent Publication Hei 4-42172 and Unexamined Japanese Patent Publication Hei 5-301250.

The apparatus 60 for implementing the method in FIGS. 1 and 2 generally includes a female mold 70 and a male mold 80 that is positioned side by side with respect to the female mold 70. The female mold 70 has a cavity 72 which corresponds to the outer profile of the shaped part to be produced. Aspiration holes 74 that are open to the cavity 72 are provided within the female mold 70, which is adapted to be driven by a drive unit 75 having a cylinder and the like so that it approaches or departs from the male mold 80. The male mold 80 has a core 82 that is to be fitted in the cavity 72; a gate 84 through which a molten resin is to be poured is provided within the male mold 80. If necessary, a heating platen 90 may be provided between the female mold 70 and the male mold 80 in such a way that it can be advanced or retracted as required.

To provide a picture or design simultaneously with injection molding on the apparatus 60, the following procedure may be taken. First, a transfer film 100 for providing the desired picture or design is placed on the lateral side of the female mold 70. If necessary, the film 100 may be heated to soften with the platen 90. Subsequently, the film 100 is held between the female mold 70 and the platen 90 to close the opening in the cavity 72. A vacuum is then drawn through the holes 74 in the female mold 70 while, at the same time, compressed air is supplied through air holes provided in the heating platen 90.

The transfer film 100 is then stretched along the inner periphery of the cavity 72 and brought into intimate contact therewith as shown in FIG. 1. The process up to this stage is generally referred to as "preliminary shaping or molding".

In the next step, the heating platen 90 is retracted and the female mold 70 is advanced as shown in FIG. 2, whereby it combines with the male mold 80 for mold clamping. Thereafter, the space of cavity formed between the two molds is filled with a molten resin that is supplied through the gate 84 in the male mold 80, thereby effecting injection molding.

As a result, the transfer film 100 in the female mold so becomes an integral part of the injected resin P and adheres to the latter so strongly that when the mold is opened after the end of the molding process, the shaped part having the transfer film 100 adhering to its outer surface can be recovered from within the mold.

In a subsequent step, the substrate film of the film 100 is peeled from the other parts of the film so that the transfer layer comprising the picture (or design) layer and other necessary layers is left intact on the shaped part S, whereby the desired picture (or design) is transferred to the latter.

As will be understood from the foregoing description, the success of the method for providing pictures simultaneously with injection molding requires that the transfer film 100 as heated to soften should be stretched sufficiently along the inner periphery of the cavity 72 so it has intimate contact with the latter (the need for good thermoformability) and that the substrate film of the transfer film 100 which has become an integral part of the outer surface of the shaped part S should positively be peeled from the other parts of the film (the need for good peelability). This is also true with other shaping methods, such as providing pictures simultaneously with vacuum press forming, that require the transfer film to be allowed to adhere, by a certain means, along the curved surface of the shaped part. The requirements are particularly critical when molding is done with a mold of great depth since the transfer film is subjected to deep drawing.

With a view to meeting these needs, many improvements in the transfer film have heretofore been proposed. They include, for example: a transfer film that comprises a heat-resistant biaxially oriented PET (polyethylene terephthalate) film as a substrate film which is overlaid with a release layer of a thermosetting resin such as a melamine rein that is baked and which, in turn, is overlaid by printing with a strippable layer and other necessary parts of the transfer layer (see Examined Japanese Patent Publication Hei 2-42080); a transfer film that comprises a thermoplastic and easy to mold PVC (polyvinyl chloride) resin as a substrate film which is coated with a release layer of a solvent-soluble polyamide which has good thermoformability an release property and which, in turn, is overlaid with a solvent-type strippable layer; and an improved version of the second type, which comprises a PVC film (substrate film) that contains 0 to 5 parts by weight of a plasticizer and which has good thermoformability, with an overlying release layer being formed by adhesive-bonding of a film of a polyamide resin such as nylon 6 or nylon 66 that are difficult to dissolve in organic solvents (see Examined Japanese Utility Model Publication Hei 4-5358).

The first-mentioned transfer film comprises the PET film that has a thermosetting resin such melamine resin baked at a temperature of ca. 80 to 150° C. to form a release layer. which, in turn, is overlaid by printing with a strippable layer and other necessary parts of the transfer layer. This transfer film is capable of good release from an injected molten resin but due to the insufficient thermoformability of the PET film, it often fails to comply faithfully with the irregular shape of the mold. If the PET is replaced by a plasticized PVC film having good thermoformability, deformation will then occur on account of the heat of baking as supplied to form the release layer and, hence, it is difficult to manufacture practically feasible transfer films. It should also be noted that in either case, the release layer which is formed by baking a thermosetting resin such as melamine resin is so hard that when the transfer film is molded along the irregular shape, cracks are prone to develop in the release layer.

The second type of transfer film which has a PVC film coated with a polyamide release layer has good moldability; however, the solvent used in printing the strippable layer will dissolve the release layer which hence mixes with and adheres to the strippable layer and this occasionally causes difficulty in stripping the substrate film in a post-molding step.

The third type of transfer film has a PVC film overlaid with a release layer that is made from a slightly solvent-soluble nylon-base polyamide resin film and which is bonded to the PVC film with an adhesive. This transfer film exhibits a certain degree of moldability; however, the need to bond the release layer with an adhesive makes it inevitable to use a thick nylon-base polyamide resin film that should not be thinner than 10 μm. Further, nylon-base polyamide resins themselves are insufficient in thermoformability to take advantage of the inherently good thermoformability of PVC. What is more, it is impossible to form solutions of conventional nylon-base polyamide resins and this is another factor that impairs the moldability of the transfer film. Polyamides that are soluble in organic solvents and which can be applied to form thin films are available by condensing dimer acids with ethylenediamine. However, the release layer that is formed of such solvent-soluble polyamides partly dissolve and swell when it is overlaid with the transfer layer by printing. Thus, it is unavoidable with the use of such special polyamide resins that the release layer mixes with and adheres to the transfer layer, making it difficult to peel the substrate film from the other parts of the transfer layer. As well as the problem of mixing and adhering, the use of PVC or other solvent-soluble resins in the substrate film not only softens but also weakens the latter upon printing the solvent-base release layer, whereby the printability of the substrate film is impaired.

SUMMARY OF THE INVENTION

The present invention has been accomplished under these circumstances and has as an object of providing an improved transfer film that is capable of providing pictures simultaneously with molding without suffering from the disadvantages of the prior art versions. Another object is to provide a process for producing such improved transfer film.

A more specific object is to provide a transfer film that is capable of providing pictures simultaneously with molding without softening or otherwise deteriorating the substrate film upon printing the release layer and which, even if the strippable layer is printed, will assure positive protection against the dissolution of the release layer by the printing solvent, thereby preventing the occurrence of unwanted mixing and adhering which would otherwise cause inefficient peeling of the substrate film from the other parts of the transfer layer and which yet retains good moldability. Another specific object of the invention is to provide a method for producing such improved transfer film.

A method of producing a transfer film for providing pictures simultaneously with molding of the present invention comprises the steps of: coating a resin on a substrate film made of a water-insoble thermoplastic resin, which is dispersed to form a water-dispersed emulsion; drying the film until the coat solidifies to form a release layer; forming a transfer layer on the release layer, which includes paint or ink diluted with an organic solvent for forming a desirable picture; and evaporating the solvent until the transfer layer turns to a solid film.

In addition, a transfer film for providing pictures simultaneously with molding of the present invention comprises: a substrate film made of a water-insoluble thermoplastic resin; a release layer formed on the substrate film, which is a dried solid film of a resin that is dispersed to from a water-dispersed emulsion; and a transfer layer formed on the release layer, which is a dried solid material including paint or ink diluted with an organic solvent for forming a desirable picture, in which the organic solvent is evaporated.

The transfer film of the present invention for providing pictures simultaneously with molding has good thermoformability since it uses a thermoplastic resin film as the substrate film. Thermoplastic resin films usually have low resistance to organic solvents; however, the substrate film used in the present invention is such that it is coated with a thermoplastic or thermosetting resin dispersed in a water-dispersed emulsion, followed by drying to form a solid film which serves as the release layer. The thus formed release layer is either insoluble or slightly soluble in organic solvents. Therefore, even if the transfer layer (strippable layer) is printed on the substrate film, there is no possibility that the release layer will dissolve in the organic solvent used to form the transfer layer. Hence, the release layer and the strippable layer will not fuse to each other (they will not adhere due to intermingling), nor will there be difficulty in peeling the substrate film from the transferred film. As a further advantage, the release layer can be coated in an increased amount without softening the substrate film because said layer itself is water-based. It should also be noted that the organic solvent used in the release layer or the transfer layer will neither deform the substrate film nor deteriorate its characteristics as by lowering the tensile strength; as a result, the transfer film of the invention is capable of maintaining its thermoformability at satisfactory level.

BRIEF DESCRIPTION OF THE DRAWINGS

In the accompanying drawings.

DETAILED DESCRIPTION OF THE PREFERRED EMBODIMENTS

Figure 1:
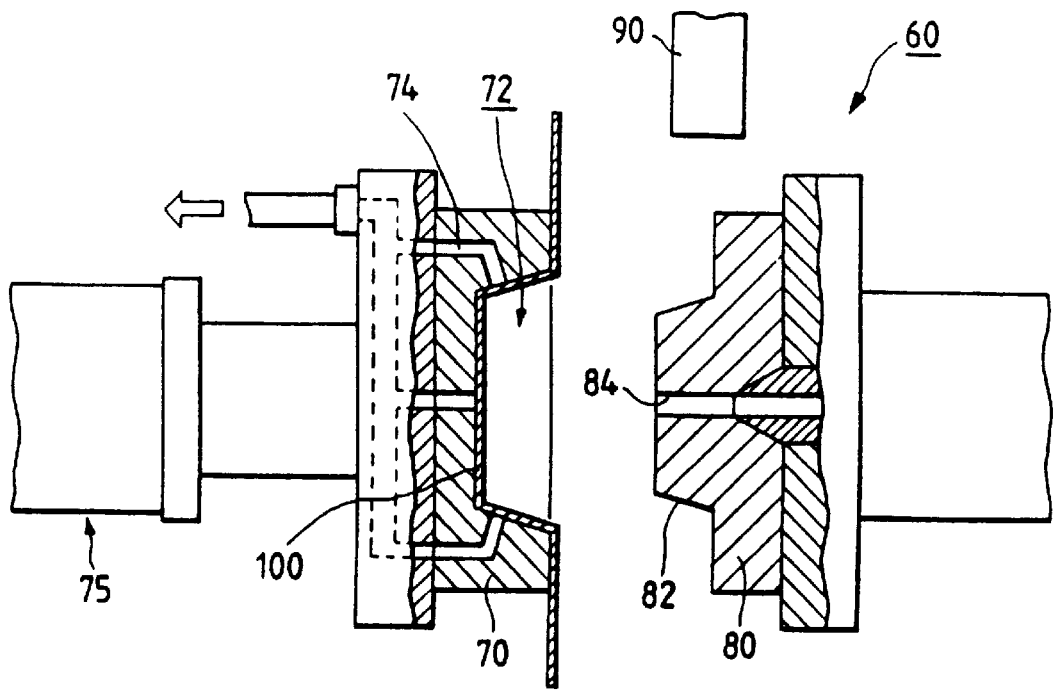
FIG. 1 is a side view showing a step of the method in a conventional apparatus for providing pictures simultaneously with injection molding.
Figure 2:
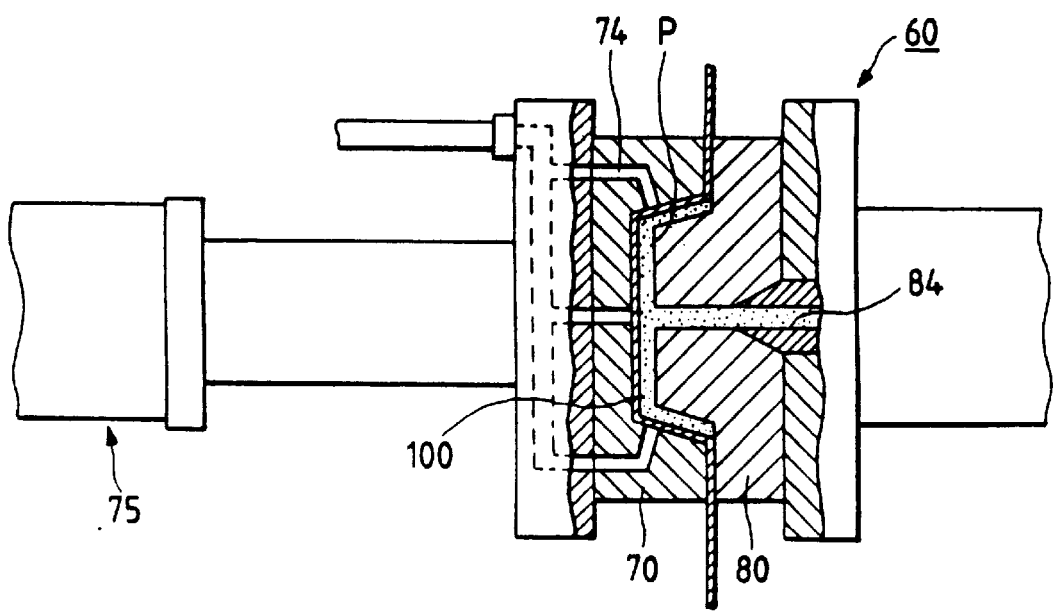
FIG. 2 is a side view showing a subsequent step of the method in the conventional apparatus.

The preferred embodiments of the present invention will be described as follows referring with the accompany drawings.

The thermoplastic resin material of which the substrate film have to be a water-insoluble material that does not dissolve or swell in the applied water-dispersed emulsion and this requirement can effectively be satisfied by using films or films of the following exemplary resin: vinyl polymers such as polyvinyl chloride, vinyl chloride-vinyl acetate copolymer, ethylene-vinyl acetate copolymer, ethylene-vinyl alcohol copolymer and the like; acrylic resins such as poly(methyl methacrylate), poly(ethyl methacrylate), poly(methyl acrylate), poly(butyl acrylate) and the like; and polyolefin resins such as polyethylene, polypropylene, polymethylpentene and the like. Among these resins, polyvinyl chloride is preferred and those having the degree of polymerization ranging from 700 to 2000 on average and which contain 5 to 30 parts by weight of a plasticizer are particularly advantageous since they have good thermoformability and are yet insoluble in water.

In addition, as a preferred substrate film to be used in the present invention, the thickness of the film $\Delta x$ (cm) may be related to thermal conductivity k (cal/sec·cm·° C.) as the following formula:

$$k/\Delta x \geq 3.0 \times 10^{-2} (\text{cal/sec·cm}^{2.\circ} \text{ C.})$$

Using the substrate film satisfying the above formula offers the advantage that the transfer film produced not only has good moldability and release property but also insures that the picture or design layer is neither distorted nor fluidized on account of the melting or softening of the transfer layer even if it is subjected to the heat or pressure of the injected resin.

The substrate film of this embodiment is particularly effective in the case where the temperature of the injected resin is higher than the melting point (or fusion temperature) of the resin component (e.g. binder) of the transfer layer.

Typical examples of this case are listed below, with relevant data on thermal conductivity and thickness being also shown.

| Resin | k (cal/sec · cm² · ° C.) | $\Delta x$ (cm) |
| --- | --- | --- |
| PVC (polyvinyl chloride containing 0 to 40 parts by weight of plasticizer) | $3.4 \times 10^{-4}$–$4.0 \times 10^{-4}$ | $\leq 113 \times 10^{-4}$–$133 \times 10^{-4}$ |
| PP (polypropylene) | $2.8 \times 10^{-4}$ | $\leq 93 \times 10^{-4}$ |
| PMMA (polymethyl methacrylate) | $4.0 \times 10^{-4}$–$6.0 \times 10^{-4}$ | $\leq 133 \times 10^{-4}$–$200 \times 10^{-4}$ |
| PE (polyethylene) | $5.26 \times 10^{-4}$ | $\leq 175 \times 10^{-4}$ |

It should be noted here that if the substrate film is too thin, it may easily break during injection molding or preliminary molding that precedes it. To avoid this possibility, the lower limit of $\Delta x$ is set at 25 $\mu$m, preferably 35 $\mu$m, for polypropylene, and 35 $\mu$m, preferably 50 $\mu$m, for polyvinyl chloride, polymethyl ethacrylate and polyethylene.

The substrate film made of these water-insoluble thermoplastic resins is overlaid with a thermoplastic or a thermosetting resin that are applied as dispersed in a water-dispersed emulsion. Water is primarily used as a medium for the water-dispersed emulsion but it may have an alcohol added thereto as exemplified by methyl alcohol or ethyl alcohol. Examples of the thermoplastic resins that may be dispersed (or suspended) in the medium include: cellulose derivatives such as ethyl cellulose, cellulose nitrate, cellulose acetate and the like; styrene resins such as polystyrene, poly-α-methylatyrene and the like, or styrene copolymers; acrylic resins such as poly(methyl methacrylate), poly(ethyl methacrylate) and the like; vinyl polymers such as polyvinyl chloride, polyvinyl acetate, ethylene-vinyl acetate copolymer and the like; rosin and rosin ester resins such as rosin-modified maleic acid resins; rubber-base resins such as polyisoprene rubber, polyisobutylene rubber and the like; and various ionomers. These thermoplastic resins may be used alone or in admixtures. Examples of the thermosetting resins that may be dispersed (or suspended) in the medium include: phenolic resin, urea resins, diallyl phthalate resin, melamine resins, guanamine resins, unsaturated polyester base resins, polyurethane-base resins, epoxy resins, aminoalkyd resins, melamine-urea co-condensation resins, silicone resins, polysiloxane resins and the like. Among these thermosetting resins, three-dimensional crosslinked polymers are particularly effective.

From among the resins listed above, one should choose those which meet the following conditions: that they should not dissolve or swell in the organic solvents used in printing or coating the transfer layer (as typically exemplified by alcohols, ketones, esters, aromatics and hydrocarbons to be discussed later); that they should not melt, fluidize, decompose or undergo other chemical changes at the molding temperature for the substrate film (between the softening and melting points, typically in the range from about 80 to about 200° C.); that they should not adhere to the transfer layer; and that they should comply faithfully with the shaping by vacuum forming or injection molding without developing any cracks.

Preferred resins are thermosets and particularly preferred are two-part curable polyurethanes having a three-dimensional crosslinked molecular structure (the products of crosslinklng between polyisocyanates and polyols, among which the products of adipate-containing polyester polyols and aliphatic isocyanates are advantages since they have the best performance in terms of solvent resistance, thermoformability and releasability) and two-part curable polyesters (the products of unsaturate polyesters and polyisocyanates).

The resin components described above are insoluble or slightly soluble in organic solvents and cannot be applied as such to the substrate film. In the present invention, those resin components are prepared by emulsion polymerization or other techniques that can achieve crosslinking an polymerization to sizes about those of colloidal particles (ca. 0.001 to 0.1 $\mu$m in diameter) and they are dispersed in the medium (water). Thus, one can prepare aqueous solutions of thermoplastic or thermosetting resins that are dispersed in an emulsion so that they can be easily applied onto the substrate, namely, liquids similar to aqueous solutions and which do not contain organic solvents. Generally, the achieving crosslinking and the dispersing are performed at one time. Preferably, the surfaces of resin particles may be coated with an emulsifier when they are dispersed in the medium (water) and this enables the preparation of water-dispersed emulsions that have even better applicability. If desired, a crosslinkable polymer may be used as the emulsifier. After applying the water-dispersed emulsion onto the substrate film, the latter may be dried so that the medium (water) is removed from between the emulsion particles, whereby one can produce a coating that is composed of a three-dimensional crosslinked macromolecule having a network structure. The coating functions as the release layer.

The coating of the water-dispersed emulsion have to be formed as low temperature as possible so that the substrate film of the thermoplastic resin is not damaged to deform or broken. At least, the temperature have to be lower than the softening temperature of the thermoplastic resin. Accordingly, the film forming aid material is add into the water-dispersed emulsion.

More preferably, one nay dilute the water-dispersed emulsion with alcohols and the like so as to insure effective printability.

The water-dispersed emulsion may be applied by any known method such as gravure reverse coating, slit reverse coating or gravure normal coating. The emulsion may be applied in the same amount as in the case of manufacturing conventional transfer films, with the preferred value ranging from about 0.1 to 10 $g/ml^2$ (dry basis). The applied emulsion may be dried and solidified by conventional means so that it turns to a film, thereby forming the release layer. The thus formed release layer is either insoluble or slightly soluble in organic solvents. Prior to the provision of the transfer layer, the surface of the release layer may be provided with patterned asperities by various techniques such as matting, hairlining and graining. The shape of the patterned asperities is transferred to the surface of the transfer layer after it is transferred to the shaped part.

Figure 8:
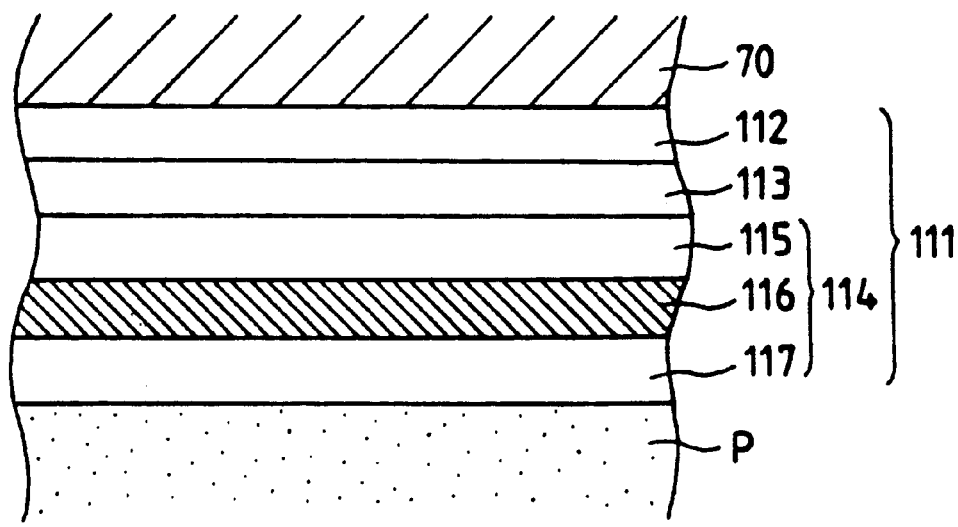
FIG. 8 is a schematic view showing an example of a transfer film of the present invention for providing pictures simultaneously with injection molding.

In the next step, the transfer layer made of a paint or an ink that are diluted with an organic solvent is formed on the surface of the release layer by coating or printing. Since the release layer formed by the procedure described in preceding paragraphs is insoluble or slightly soluble in organic solvents, the organic solvents that can be used in diluting paints or inks are not limited to any particular kinds and suitable solvents may be selected from among all conventional organic solvents including, for example: eaters such as ethyl acetate and butyl acetate; ketones such as acetone and methyl ethyl ketone; aliphatic hydrocarbons such as hexane and petroleum benzine; aromatic hydrocarbons such as toluene and xylene; halogenated hydrocarbons; monohydric alcohols such as ethyl alcohol and propyl alcohol; polyhydric alcohols such as ethylene glycol; and ethers. The choice of suitable solvents depends on the type of paints or inks used. The transfer layer may solely be composed of a picture or design layer or, if necessary, it may have a multi-layer arrangement including a picture or design layer. In the latter case, the transfer layer may include a strippable surface protect layer (hereinafter, strippable layer)/a picture layer, a picture layer/an adhesive layer, or a strippable layer/a picture layer/an adhesive layer. If organic solvents need be used in one or more of those layers, any types of organic solvents may be employed. For example, as shown in FIG. 8, the transfer film 111 of the present invention for providing pictures simultaneously with molding has a substrate film 112 which attached to a female mold 70, releasable layer 113, transfer film 114 including a strippable layer 115, a picture layer 116 and adhesive layer 117 which adheres to an injected resin P. Namely, the adhesive layer 117 affects to adhere the transfer film 111 to the injected resin P (or molded product). Then, the injected resin P is taken out from a cavity, and the transfer film 111 is stripped by pulling off the substrate film 112 with the releasable layer 113 so that the stripping is performed between the releasable layer 113 and strippable layer 115. Furthermore, the strippable layer 115 protects the transfer film which remains in the side of the injected resin P so that a picture in the picture layer 116 can be protected.

The transfer layer is made by applying the ink or paint diluted by the above organic solvent on the resin which is preferably acrylic resin such as poly(methyl methacrylate), poly(ethyl methacrylate), poly vinyl acetate, vinyl chloride-vinyl acetate copolymer, polystyrene, polyurethane resin, polyester resin or the like.

In case of making the picture layer, colorant such as a pigment or color is add in the resin so as to print or paint a desirable pattern. Each layer of the transfer layer such as the strippable layer, picture layer and adhesive layer generally has a thickness of 1 to 10 $\mu$m. The gravure printing, silk screen printing or the like is employed to printing the pattern.

The thus formed transfer layer is subsequently dried by evaporating the organic solvents by any of the techniques in current practice so that it turns to a solid film, whereby one can produce the transfer film of the present invention for providing pictures simultaneously with molding.

EXAMPLE

The following example and comparative examples are given for the purpose of further illustrating the present invention.

1. Each of the three substrate films identified below was combined with a release layer to prepare films.

(i) EXAMPLE

A polyvinyl chloride film 80 $\mu$m thick (plasticizer content=12 parts by weight; RIKEN VINYL type R) was used as a substrate film. The film was overlaid with a release layer that was formed by the steps of dispersing a polyester polyol type two-part curable urethane resin composition (for its formula, see below) in water to form a water-dispersed emulsion with a solids content of 30%, adding methanol as a diluent to a solids content of 15%, applying the paint by gravure reverse coating to give a deposit of 3 $g/m^2$ (dry basis), and drying the applied coat so that it turned to a solid film (in accordance with the invention). The solidification is performed under the temperature of 40° C.

Polvester Polyol Type Two-part Curable Urethane Resin Composition

| | |
|---|---|
| Urethane resin | 89 wt % |
| Urethane resin reacted by polyol (adipate containing polyester polyol) and isocyanate (aliphatic isocyanate) | |
| Film forming aid (3-methyl-methoxybutanol) | 10 wt % |
| Others (triethylamine) | 1 wt % |
| Dispersion medium (water) | |

(ii) Comparative Example I

The same substrate film as used in (i) was overlaid with a release layer that was formed by the steps of dissolving a polyamide (the product of condensation between a dimer acid and ethylenediamine) in toluene to a concentration of 15%, coating the solution as in (i), and drying the applied coat so that it turned to a solid film.

(iii) Comparative Example II

PET film 50 µm thick (Diafoil GH-50, with baked melamine resin).

2. Each of the films (i) to (iii) was provided with the following layers that were printed in the order written to form a transfer layer and each of the solvents are evaporated until the transfer layer turns to a solid film.

| | |
|---|---|
| (1) strippable layer | |
| Acrylic resin (solvent: MEK/toluene) | 1 g/m² (dry basis) |
| (2) picture layer | |
| Mixture of acrylic resin and vinyl chloride/vinyl acetate copolymer (solvent: MEK/toluene) | 1 g/m² (dry basis) |
| (3) adhesive layer | |
| Acrylic resin (solvent: MEK/toluene) | 1 g/m² (dry basis) |

3. Each of the three examples of transfer film was placed in a female mold (3 cm deep×10 cm long×5 cm wide), heated at 110° C. to soften and subjected to preliminary molding by vacuum forming. The transfer film sample prepared as described under 1 (iii) did not have good moldability and it was impossible to insure that the sample would comply faithfully with the inner profile of the cavity in the female mold.

Figure 3:
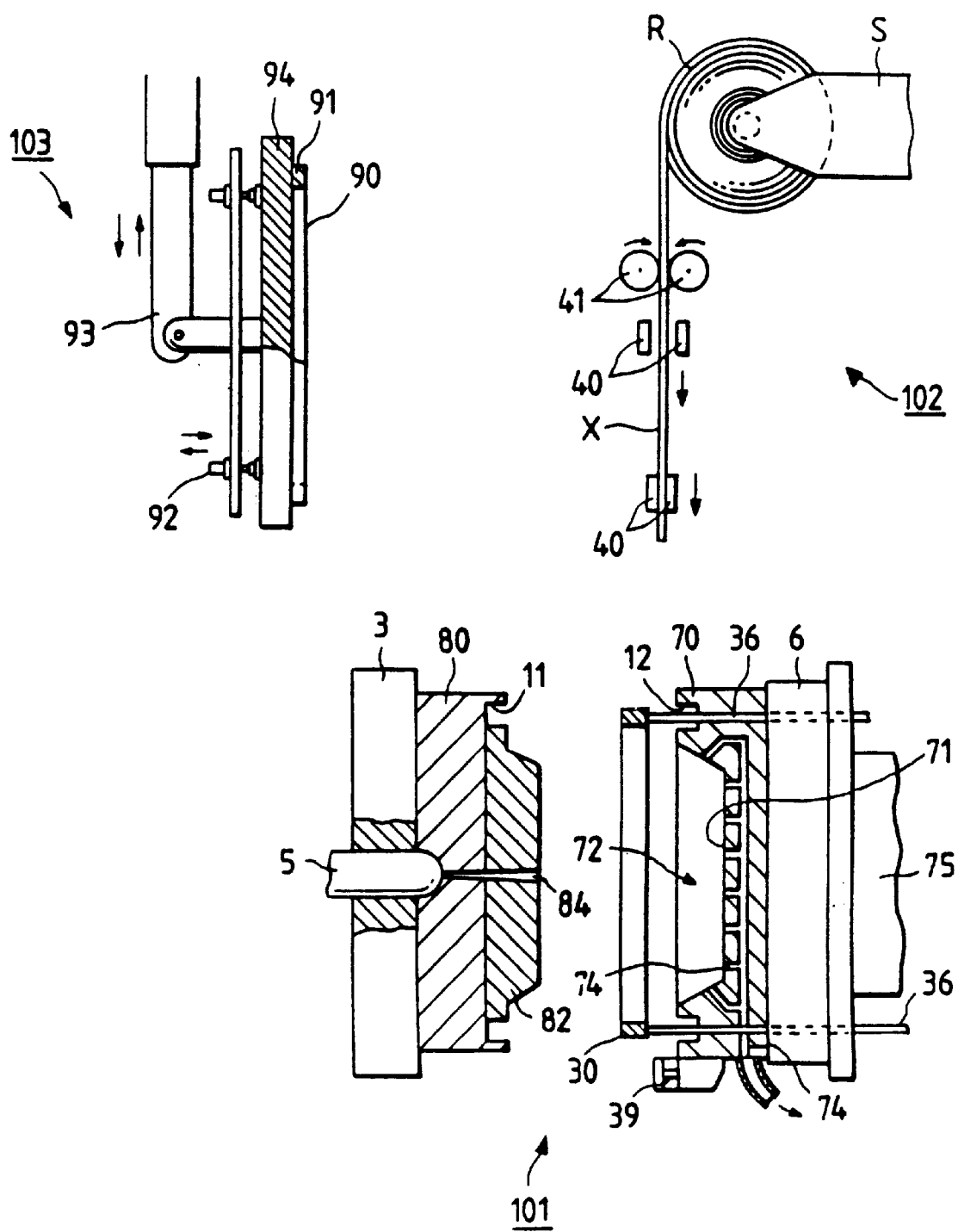
FIG. 3 is a side view showing a step of the method of the present invention for providing pictures simultaneously with injection molding.

FIG. 3 shows an example of injection molding apparatus to which the transfer film for providing pictures simultaneously with molding is applied. The apparatus has a molding portion 101, transfer film supplying portion 102 and platen portion 103.

The molding portion 101 has a female mold 70 and male mold 80 that is positioned side by side with respect to the female mold 70. The female mold 70 has a cavity 72 which corresponds to the outer profile of the shaped part to be produced. Aspiration hole 74 that are open to the cavity 72 are provided within the female mold 70. At the back side of them, the movement plate 6 is mounted. In addition, film cramp fitting groove are provided around the female mold 70. Sliding poles 36 pass through the groove, female mold 70 and movement plate 6. The top end portion of the slide poles 36 are connected to a film cramp 30. Downstream retainers 39 for holding the downstream side of a film supplied from the transfer film providing portion 102 is provided on the bottom end portion of the female cavity 70. The female cavity 70 is adapted to be driven by a drive unit 75 so that it approaches or departs from the male mold 80. Further, the male mold 80 has a core 82 that is to be fitted in the cavity 72 and a sheet cramp retracting groove 11 around the core 82. A nozzle 5 for passing the molten resin therethrough and gate 84 for injecting it into the cavity 72 at the substantially center of the core 82. A fixing plate 3 is mounted on the back side of the male mold 80.

On the other hand, The transfer film supplying portion 102 has a rolled film supporting device S and rolled transfer film R supported by the device S. The leading edge of a transfer film X drawn out from the rolled transfer film R is gripped by a film zipper 40, and the film X is transported to a predetermined position in the cavity 72 by the pulling force of the zipper 40 and the driving force of a pair of feed rolls 41.

Furthermore, the platen portion 103 has a platen 90, heating plate 94 for heating the platen 90 and a peripheral wall 91 which surrounds the platen 90 in a bank form. The platen 90 Is moved in a vertical and horizontal directions by driving cylinders 92, 93 provided on the back thereof.

Stated more specifically, the transfer film was subjected to preliminary molding by using the above apparatus in the following manner.

First, as shown in FIG. 3, the transfer film is drawn out from rolled film R and with its leading edge being gripped with the film zipper 40, the transfer film X is transported to a predetermined position facing the inner surface 71 of the cavity in the female mold 70 by the pulling force of the zipper 40 and the driving force of a pair of feed rolls 41. On this occasion, the female mold 70 and the male mold 80 are separated from each other and a heating platen 90 is in a retracted position remote from the space between the two molds.

Figure 4:
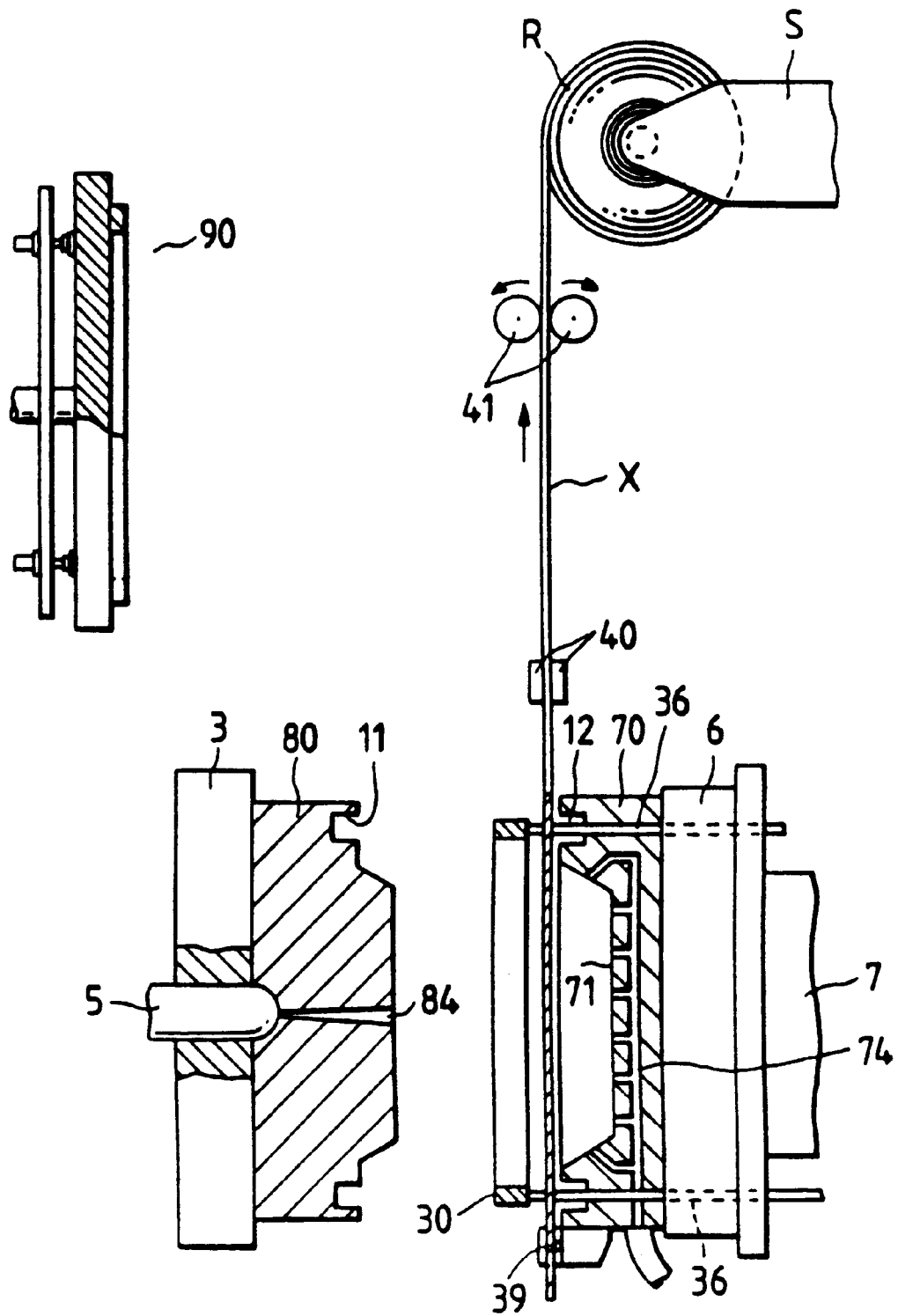
FIG. 4 is a side view showing a next step of the method.

In the next step, the leading edge of the transfer film x which is advanced to the predetermined position facing the female mold 70 is gripped between downstream retainers so that it is securely held in a position downstream of the female mold, as shown in FIG. 4. Thereafter, the rolling film supporting device S and the feed rolls 41 apply sufficient tension to remove any sag from the transfer film. On this occasion, the zipper 40 is in a retracted position upstream of the female mold 70.

In further step, the film cramp 30 moves toward the female mold 70 because the slide poles 36 is moved in the right direction of the figure, so that the film cramp 30 is fitted and fixed on the film cramp fixing groove 12.

Figure 5:
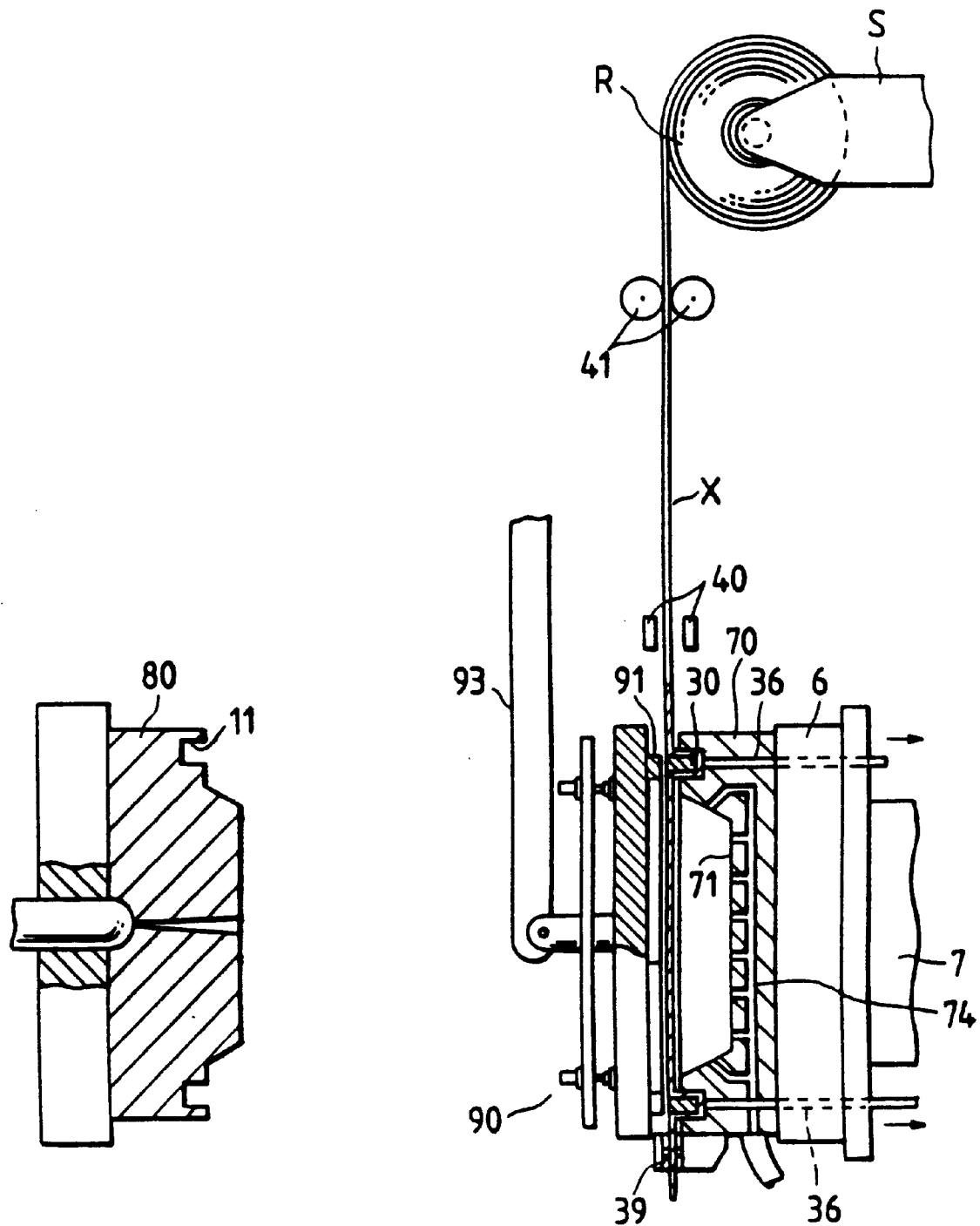
FIG. 5 is a side view showing a subsequent step of the method.

Then, as shown in FIG. 5, a heating platen 90 is driven by the cylinders 91, 93 to be transported to a predetermined position facing the surface 71 of the cavity in the female mold 70. The peripheral wall 91 is brought into intimate contact with film clamp 30 in the position indicated in FIG. 5. As shown in FIG. 5, the transfer film X is spaced from the heating plate 94 by the peripheral wall 91 and yet it is subjected to non-contact heating by means of radiation heat and exposure to the surrounding hot atmosphere.

Figure 6:
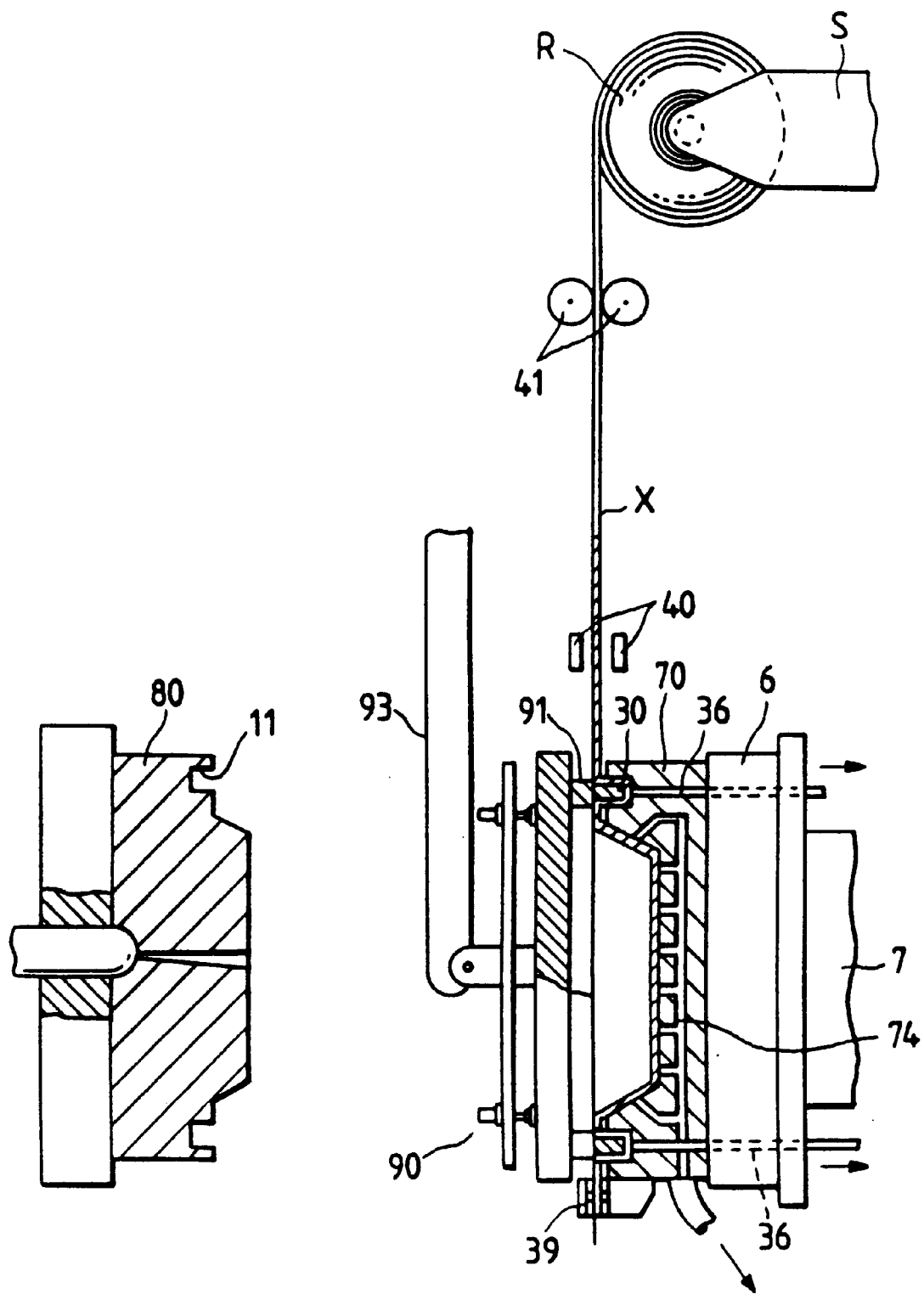
FIG. 6 is a side view showing a further subsequent step of the method.

When the transfer film X become adequately soft by heating, a vacuum is drawn through aspiration holes 74 as shown in FIG. 6, whereby the film X adheres closely to the inner surface 71 of the cavity in the female mold 70 to be given a shape that duplicated its shape faithfully.

Figure 7:
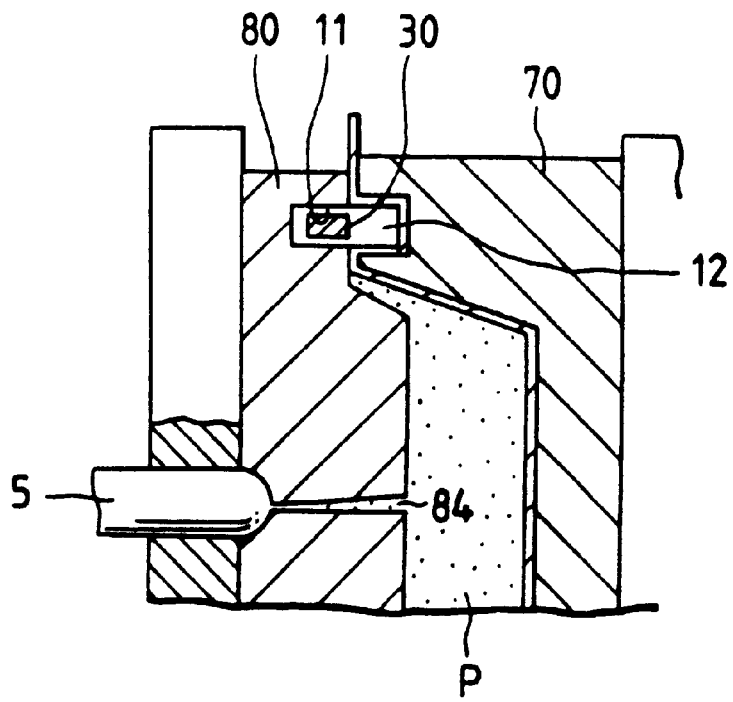
FIG. 7 is a partial enlarged view of FIG. 6.

Using the mold in which the transfer film is subjected to the above preliminary molding, polystyrene (PS) resin was injection molded at a nozzle temperature of 230° C. After the and of injection molding, the film clamp 30 was retracted to the film cramp retracting groove 11 in the outer surface of the male mold 80 as shown in FIG. 7 and mold opening was affected to recover the shaped part having the transfer film adhere to the outer surface.

Three shaped parts were obtained for the respective samples of transfer film. Each film was stripped by pulling off the substrate film. On the shaped part using the transfer film of comparative example 1, the substrate film was peeled with adhesion breakage occurring at the interface between the release layer and the strippable layer. In addition, the substrate film remained unpeeled in several areas. Therefore, the intended picture or design was not transferred to the shaped part in a satisfactory way. This could be explained as follows: the heat generated during molding caused the release layer to dissolve in the (very small amount of) residual solvent in the strippable layer, whereupon the two layers fused thermally to each other.

However, on the shaped part using the transfer film sample prepared in accordance with the invention as described under 1(i), the substrata film could be peeled smoothly, providing the desired picture or design to the surface of the shaped part which duplicated faithfully the deep drawn shape of the female mold. The transferred picture or design layer was free from any distortion or fluidization that would otherwise occur on account of the heat or pressure of the injected resin.

It was thus demonstrated that the transfer film according to the invention for providing pictures simultaneously with molding had effective moldability and peelability.

The transfer film for providing pictures simultaneously with molding that is manufactured by the process of the present invention is satisfactory in terms of both moldability and peelability; hence, the transfer film enables desired pictures or patterns to be provided on the surfaces of shaped parts that need be molded with the film being subjected to deep drawing.

What is claimed is:

1. A transfer film for providing pictures onto a molded product simultaneously with molding comprising:

a substrate film having at least a substrate film surface, the substrate film comprising thermoplastic resin, wherein a thickness of said substrate film $\Delta x$ (cm) being related to thermal conductivity k (cal/sec·cm·° C.) as a formula of $k/\Delta x \geqq 3.0 \cdot 10^2$ (cal/sec·cm$^2$·° C.);

a release layer formed on said substrate film; and a transfer layer formed on said release layer including a desirable picture layer.

2. A transfer film for providing pictures onto a molded product simultaneously with molding according to claim 1, wherein said release layer comprises a dried solid film of a thermosetting resin having a three-dimensional crosslinked macromolecule structure dispersed in a dispersing medium to form a water-dispersed emulsion.

3. A transfer film for providing pictures onto a molded product simultaneously with molding according to claim 2, wherein said dispersing medium comprises water.

4. A transfer film for providing pictures onto a molded product simultaneously with molding according to claim 3, wherein said dispersing medium further comprises alcohol.

5. A transfer film for providing pictures onto a molded product simultaneously with molding according to claim 1, wherein said thermoplastic resin is polyvinyl chloride.

6. A transfer film for providing pictures onto a molded product simultaneously with molding according to claim 5, wherein said polyvinyl chloride has a degree of polymerization ranging from 700 to 2000 on average and contains 5 to 30 parts by weight of a plasticizer.

7. A transfer film for providing pictures onto a molded product simultaneously with molding according to claim 1, wherein said transfer layer comprises at least one of a strippable surface protect layer in which said transfer film is stripped by pulling off said substrate film with said releasable layer so that stripping is performed between said releasable layer and strippable layer, a picture layer in which desirable pictures are formed, and an adhesive layer for allowing said substrate film to adhere to a product.

* * * * *